United States Patent
Yang et al.

(10) Patent No.: US 8,048,175 B2
(45) Date of Patent: Nov. 1, 2011

(54) QUICK REMOVAL OF MERCAPTANS FROM HYDROCARBONS

(75) Inventors: Jianzhong Yang, Missouri City, TX (US); Joseph J. Arensdorf, Oak Ridge North, TX (US); Melanie V. Barker, League City, TX (US)

(73) Assignee: Baker Hughes Incorporated, Houston, TX (US)

( * ) Notice: Subject to any disclaimer, the term of this patent is extended or adjusted under 35 U.S.C. 154(b) by 294 days.

(21) Appl. No.: 12/420,605

(22) Filed: Apr. 8, 2009

(65) Prior Publication Data

US 2009/0255849 A1  Oct. 15, 2009

Related U.S. Application Data

(60) Provisional application No. 61/044,143, filed on Apr. 11, 2008.

(51) Int. Cl.
*C10L 1/10* (2006.01)
*C10L 1/22* (2006.01)

(52) U.S. Cl. .............. 44/328; 508/184; 208/14; 208/15; 208/219

(58) Field of Classification Search .................... 44/328, 44/385, 391, 418, 421; 508/184; 208/14–15, 208/219; 585/1–4
See application file for complete search history.

(56) References Cited

U.S. PATENT DOCUMENTS

| | | | |
|---|---|---|---|
| 2,893,952 A | 7/1959 | Chenicek | |
| 4,569,766 A | 2/1986 | Kool et al. | |
| 5,167,797 A | 12/1992 | Ou | |
| 5,510,568 A | 4/1996 | Hearn | |
| 5,840,177 A | 11/1998 | Weers et al. | |
| 6,063,346 A * | 5/2000 | Luna | 423/220 |
| 6,599,472 B1 | 7/2003 | Hudson | |
| 2001/0050245 A1 | 12/2001 | Hearn et al. | |
| 2004/0091753 A1 | 5/2004 | Terorde et al. | |

FOREIGN PATENT DOCUMENTS

WO  2005097300 A1  10/2005

OTHER PUBLICATIONS

J. P. Schaack, et al., "Formaldehyde-methanol, Metallic-oxide agents Head Scavengers List," Technology Oil & Gas Jrnl, Jan. 23, 1989, pp. 51-55.

J. M. Bakke, et al., "Hydrogen Sulfide Scavenging by 1,3,5-Triazinanes. Comparison of the Rates of Reduction," Ind. Eng. Chem. Res., 2004, vol. 43, pp. 1962-1965.

* cited by examiner

*Primary Examiner* — Cephia D Toomer
*Assistant Examiner* — Pamela H Weiss
(74) *Attorney, Agent, or Firm* — Mossman Kumar & Tyler PC

(57) ABSTRACT

Mercaptans and/or hydrogen sulfide ($H_2S$) in hydrocarbons, naphthas, gasolines, and the like may be scavenged therefrom by being brought into intimate contact with a mercaptan scavenger formulation containing at least one disubstituted azodicarboxylate of the formula $R^1OOCN=NCOOR^2$, where $R^1$ and $R^2$ are independently alkyl groups, alkenyl groups and aromatic groups having from 1 to 18 carbon atoms. These scavengers remove mercaptans and/or $H_2S$ from hydrocarbons faster than many conventional mercaptan scavengers. An effective scavenging amount of disubstituted azodicarboxylate in the hydrocarbon fluid ranges from about 5 to about 20 parts by weight based on 1 part as sulfur of mercaptan and/or $H_2S$.

16 Claims, 1 Drawing Sheet

US 8,048,175 B2

QUICK REMOVAL OF MERCAPTANS FROM HYDROCARBONS

CROSS-REFERENCE TO RELATED APPLICATION

This application claims the benefit of U.S. Provisional Patent Application No. 61/044,143 filed Apr. 11, 2008.

TECHNICAL FIELD

The present invention relates to methods and compositions for scavenging of hydrogen sulfide ($H_2S$) and/or mercaptans in hydrocarbon fluids and more particularly to the use of disubstituted azodicarboxylates as mercaptan scavengers.

TECHNICAL BACKGROUND

Hydrocarbon fluids, such as crude oil, crude oil emulsions, oilfield condensate, petroleum residua and even refined fuels often contain a variety of mercaptans, including mercaptans of relatively low molecular weight. In the drilling, production, transport, storage, and processing of hydrocarbon stocks, the mercaptans encountered can cause many problems ranging from malodors to metal corrosion. Because of the volatility of mercaptans of relatively low molecular weight (for example, methyl mercaptan, $CH_3SH$, ethyl mercaptan, $CH_3CH_2SH$ and propyl mercaptan, $CH_3CH_2CH_2SH$), they tend to evolve into vapor spaces, where their offensive odors create problems in and around storage areas and throughout pipelines and shipping systems used for transporting the hydrocarbon. Mercaptans in crudes, naphthas and gasoline streams present safety concerns and corrosion hazards.

Various additives have been employed in efforts to alleviate these problems. For example, choline or choline hydroxide has been found to alleviate hydrogen sulfide ($H_2S$) evolution and to scavenge mercaptans. See, for example, U.S. Pat. No. 4,594,147 to Roof et al., U.S. Pat. No. 4,867,865 to Roof and U.S. Pat. No. 5,183,560 to Roof et al. However, choline and choline hydroxide are not well suited for many uses and media, such as in crude oil. Although choline and choline hydroxide might scavenge mercaptans in such media, they also form a volatile and malodorous by-product with the sulfur compounds indigenous to such media. Accordingly, the use of choline and choline hydroxide to control odors associated with light weight mercaptans is self-defeating in media such as crude oil. Thus, the cited patents to Roof and Roof, et al. fail to address this problem and instead describe the use of choline or choline hydroxide in the more refined fuel oils.

European application 0 538 819 A3 to Roof et al. describes the use of oil-soluble quaternary ammonium compounds of the formula:

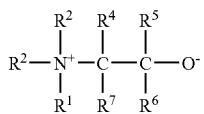

to scavenge various sulfur compounds, including mercaptans, from certain oils, especially high boiling, heavy residual fuels. These compounds, prepared under anhydrous conditions, are what are described herein as "internal ions"; i.e., the positive charge on the nitrogen and the negative charge on the oxygen result in overall electrically neutral compounds without the presence of counter ions such as halides. The European application stresses the significance of the oil solubility of these compounds, noting that they are more oil soluble than choline base and so disperse through the oil being treated more thoroughly to decrease the concentration of undesirable sulfur compounds more effectively. Nevertheless, the compositions of the European application suffer from certain disadvantages. For example, compositions that are produced in higher yields, yet still at low cost, and that reduce mercaptan concentrations more effectively are still desired.

U.S. Pat. Nos. 5,840,177 and 6,013,175 relate to methods for scavenging mercaptans in hydrocarbon fluids using quaternary ammonium hydroxides. Other chemistries and methods for removing mercaptans from hydrocarbons include caustic (NaOH solutions) and cobalt with caustic (Merox™ process of UOP, Merichem processes).

A quick removal of these smelly mercaptan species would be desirable in both oilfield and refinery operations. Many conventional mercaptan scavengers remove and/or react with the mercaptans present only slowly. There is a continuing need in the liquid fuel industry for treating liquid hydrocarbon stocks and wet or dry gas mixtures containing mercaptans using new compositions and methods that would scavenge mercaptans quickly.

SUMMARY

There is provided, in one non-limiting embodiment a method for scavenging sulfur-containing compounds such as $H_2S$ and/or mercaptans from a hydrocarbon fluid that involves adding to the hydrocarbon fluid an amount of at least one dialkyl azodicarboxylate that is effective to scavenge the $H_2S$ and/or mercaptans therefrom. The disubstituted azodicarboxylates have the formula $R^1OOCN\!\!=\!\!NCOOR^2$, where $R^1$ and $R^2$ are independently alkyl groups, alkenyl groups and aromatic groups having from 1 to 18 carbon atoms. The term "independently" with respect to $R^1$ and $R^2$ means that $R^1$ and $R^2$ may be the same or different within the above-noted definition.

Further, there is provided in another non-restrictive version a hydrocarbon composition that has a reduced sulfur-containing compounds (e.g. $H_2S$ and/or mercaptan) presence. The hydrocarbon composition includes a hydrocarbon fluid, at least one mercaptan and/or $H_2S$, and an amount of at least one disubstituted azodicarboxylate of the formula given above that is effective to scavenge at least some of the mercaptan, where at least some of the additive has reacted with the mercaptan.

DETAILED DESCRIPTION

Figure 1:
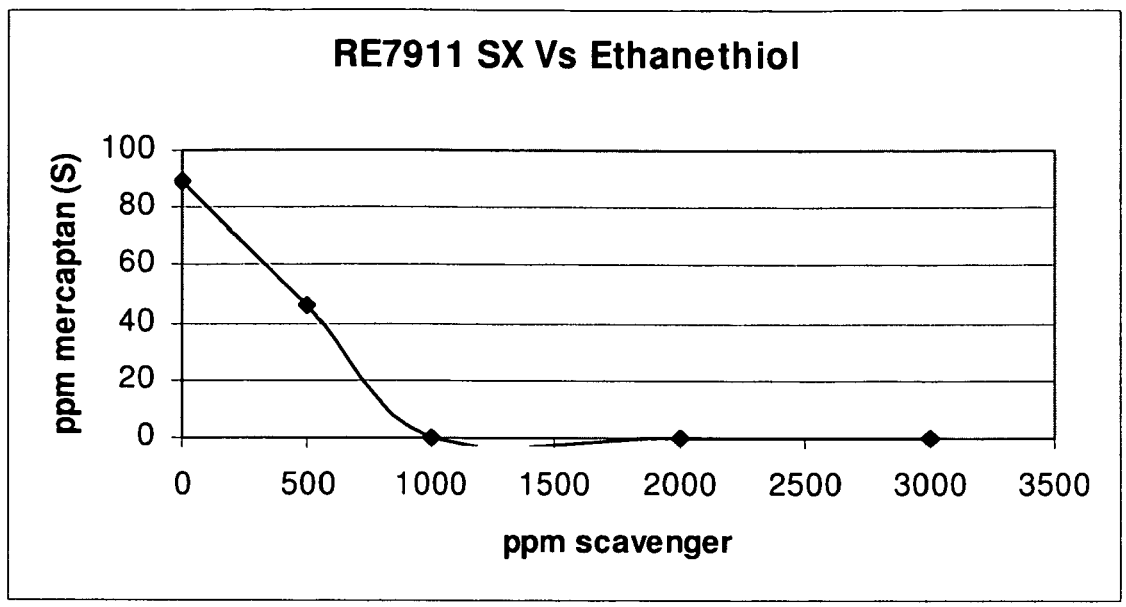
FIG. 1 is a graph of the proportion of ethanethiol mercaptan scavenged as a function of the amount of RE7911HSOdialkyl azodicarboxylate added to a hydrocarbon containing ethanethiol.

A new mercaptan scavenger system has been discovered to reduce the mercaptan level in hydrocarbon streams. The new mercaptan scavengers are disubstituted azodicarboxylates of the formula $R^1OOCN\!\!=\!\!NCOOR^2$, where $R^1$ and $R^2$ are independently alkyl groups, alkenyl groups and aromatic groups having from 1 to 18 carbon atoms. In one non-limiting embodiment, $R^1$ and $R^2$ are independently alkyl groups having from 2 to 3 carbon atoms. Unless noted otherwise the alkyl groups herein may be straight, branched and/or cyclic.

These compounds are well known as strong electron acceptors, which allow them to function as dehydrogenation organic oxidants. It was discovered that they were excellent scavengers to remove mercaptans and/or $H_2S$ in different hydrocarbon streams, such as crude oils, gasolines, or naphtha. The treated medium may be any hydrocarbon fluid, and a liquid is expected to be most common, although dry gas mixtures containing mercaptans may also be treated. For example, excellent results have been obtained from treatment of crude oil, and are expected from petroleum residua and fuels such as kerosene. It should be recognized that while the fluids are referred to as hydrocarbon fluids, in some cases (for example, crude oil emulsions), hydrocarbons may make up less than half of the fluid by weight. The scavengers are particularly useful for treatment of crude oil in that they do not add an additional malodorous compound as has been associated with the use of choline to treat crude oil. More specifically, the hydrocarbon fluids to which the method herein may be applied include, but are not limited to, crude oil, oil field condensates (e.g. natural gas liquid, etc.), residual fuels, petroleum distillates (e.g. gasoline, kerosene, diesel, etc.) light hydrocarbons (e.g. natural gases, naphtha, light aromatics etc.), and paraffinic solvents (e.g. pentane, heptane, etc.), renewable fuels such as biodiesel, and mixtures thereof. Further, the hydrocarbon fluids may contain oxygenated compounds such as alcohols, esters, glycols, ethers and the like and mixtures thereof.

The disubstituted azodicarboxylates are very reactive and can present an explosion risk to release nitrogen gas if they are heated in a confined space. To ensure safe handling of these compounds, in one non-limiting embodiment they may be reformulated in aromatic solvents in a variable concentration range of from about 10 to about 40 weight %, but not higher than about 50 wt %. One acceptable aromatic solvent is Aromatic 100 Hydrocarbon Fluid available from ExxonMobil Chemical, although others are certainly expected to be useful, including, but not necessarily limited to, methyl isobutyl ketone, acetonitrile, N,N-dimethyl formamide and the like, etc.

An advantage of the present mercaptan scavengers is their superior capacity to remove a wide spectrum of mercaptans. As defined herein mercaptans are thiols and are defined as any of a group of organic compounds resembling alcohols, but having the oxygen of the hydroxyl group replaced by sulfur. That is, mercaptans generally refer to organic compounds containing a —SH functional group (R—SH). The common mercaptans are C1-C4 mercaptans (e.g. where R is a straight or branched alkyl group of from about 1 to 4 carbon atoms), but R may be higher alkyl (which may be straight, branched and/or cyclic) and may be aromatic. It is expected that hydrogen sulfide ($H_2S$) may also be scavenged by the methods and additives herein, and while not technically a mercaptan may be understood as included among the species being scavenged. It will thus be understood that when "mercaptan" is discussed, $H_2S$ is included as a species that is also expected to be scavenged herein and the term "sulfur-containing compounds is sometimes used herein to include both mercaptans and $H_2S$). It is anticipated that the scavenger will react with $H_2S$ in the following fashion:

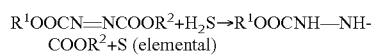
(I).

In accordance with the present invention, it has been unexpectedly discovered that certain disubstituted azodicarboxylates are surprisingly effective mercaptan scavengers that scavenge mercaptans from crude oils and gasolines at a rapid pace compared with some conventional mercaptan scavengers. For instance, the scavenging treatment may be finished in one hour or less, instead of days as with some prior mercaptan scavengers. The disubstituted azodicarboxylates may remove mercaptan sulfur in a weight ratio of from about 5:1 to about 20:1, in another non-limiting embodiment from about 8:1 independently up to about 15:1 scavenger:mercaptan sulfur when the dialkyl azodicarboxylate is dosed as a 40 wt % active solution in Aromatic 100. This ratio of from about 5:1 to about 20:1 is higher than some ratios of conventional scavengers where the weight of scavenger to mercaptan sulfur is between about 1:1 and about 2.5:1.

It will also be appreciated that it is not necessary for all of the sulfur-containing compounds (e.g. $H_2S$ and/or mercaptan) present in the hydrocarbon to be reacted and/or removed for the compositions, additives, and methods herein to be considered successful. The compositions and methods have accomplished a goal when the amounts of sulfur-containing compounds are reduced as a consequence of being contacted with the compositions described herein.

Effective scavenging may be carried out at the ambient temperature of the hydrocarbon fluid (e.g., about 20° C. for stored crude oil, residuum or fuel), or at elevated temperatures. It is not necessary that the mixture of the fluid and the scavenger be subjected to any particular temperature necessary to scavenge the mercaptans and/or $H_2S$.

It is believed that the disubstituted azodicarboxylates may also be effectively used as minor components in blends with other conventional mercaptan scavengers. The inclusion of the disubstituted azodicarboxylates in such blends may function as an oxidant to oxidize and promote the regeneration of the reactive forms of other scavengers and promote the ability of the conventional scavengers to remove more than one mole of mercaptan per mole of scavenger. The conventional scavengers that may be assisted in this regard include, but are not necessarily limited to, triazines, maleimides, quaternary ammonium hydroxides, aldehydes, amines, carboxamides, cumine-peroxide compounds, quinone based compounds.

The following examples describe certain specific, non-limiting embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLES 1 AND 2

Figure 2:
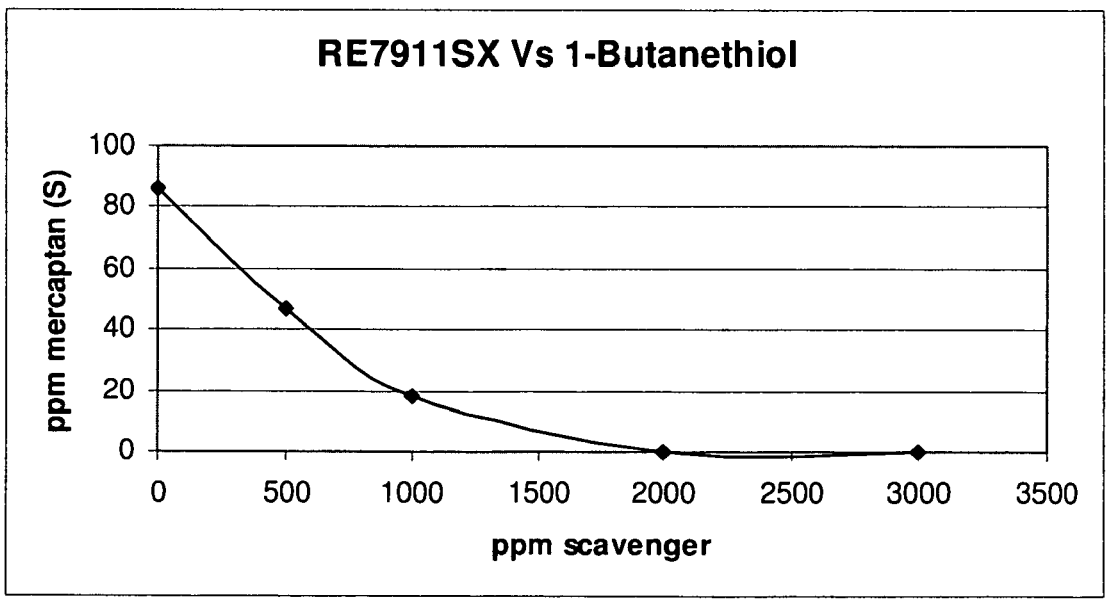
FIG. 2 is a graph of the proportion of 1-butanethiol mercaptan scavenged as a function of the amount of RE7911HSOdialkyl azodicarboxylate added to a hydrocarbon containing 1-butanethiol.

Shown in FIGS. 1 and 2 are graphs of mercaptan contents as a function of the amount of mercaptan scavenger present. FIG. 1 is for ethanethiol (Example 1), while FIG. 2 is for 1-butanethiol (Example 2). The hydrocarbon fluid from which the mercaptans were scavenged was a blend of hexanes with toluene in both cases. The dialkyl azodicarboxylate mercaptan scavenger, designated RE7911HSO was diethyl azodicarboxylate. It was introduced into the mercaptan-containing hydrocarbon in a proportion of 40 wt % in Aromatic 100 aromatic solvent.

It may be seen from FIG. 1 that all of the ethanethiol was removed from the hydrocarbon at a dosage of 1000 ppm scavenger and beyond. From FIG. 2 it may be seen that all of the 1-butanethiol was removed from the hydrocarbon at a dosage of 2000 ppm scavenger and beyond.

EXAMPLE 3

In another example, a C3 mercaptan dosed Aromatic 100/ toluene blend was treated with dipropyl azocarboxylate (DIAD, 40 wt %). Aromatic100 is available from Exxon Mobil Chemical Company. The blend was titrated 1 hr after the mixing at RT (room temperature). The results are shown in Table I. It may be seen that at a dose of 2000 ppm of this different scavenger all of the mercaptan was scavenged from the blend.

TABLE I

| Additive | Dose (ppm) | Mercaptan S content (ppm) | color |
|---|---|---|---|
| — | 0 | 146 | Clear |
| DIAD (40 wt. %) | 1000 | 15 | Light yellow, clear |
| DIAD (40 wt. %) | 2000 | 0 | Light yellow, clear |

EXAMPLE 4

In Example 4, 328 ppm of a complex mixture of thiols was added to Caspian crude oil and then treated with the indicated dosages of the RE7911HSO scavenger of Examples 1 and 2. The blend was titrated 3 hrs after the mixing at RT (room temperature). The results are shown in Table II. It may be seen that at increasing dosages of the scavenger, increasing amounts of the mercaptan were scavenged from the blend.

TABLE II

| Additive | Dose (ppm) | Mercaptan S content (ppm) | color |
|---|---|---|---|
| — | 0 | 333 | Clear |
| — | 0 | 324 | Clear |
| RE7911HSO | 1000 | 264 | No change visible |
| RE7911HSO | 3000 | 170 | No change visible |

In the foregoing specification, the invention has been described with reference to specific embodiments thereof. It has been demonstrated as effective in providing methods and compositions for reacting with and reducing the sulfur-containing compounds (e.g. $H_2S$ and/or mercaptans) proportions in hydrocarbons, particularly crude oil, naphtha and gasoline. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of disubstituted azodicarboxylate and conventional mercaptan scavengers, to scavenge single and a plurality of mercaptans and/or $H_2S$, falling within the claimed parameters, but not specifically identified or tried in a particular composition or under specific conditions, are anticipated to be within the scope of this invention.

The words "comprising" and "comprises" as used throughout the claims, is to be interpreted to mean "including but not limited to" and "includes but not limited to", respectively.

The present invention may suitably comprise, consist or consist essentially of the elements disclosed and may be practiced in the absence of an element not disclosed.

What is claimed is:

1. A method for scavenging sulfur-containing compounds from a hydrocarbon fluid, the method comprising adding to the hydrocarbon fluid an effective sulfur-containing compounds scavenging amount of at least one disubstituted azodicarboxylate of the formula $R^1OOCN=NCOOR^2$, where $R^1$ and $R^2$ are independently alkyl groups, alkenyl groups and aromatic groups having from 1 to 18 carbon atoms.

2. The method of claim 1 where the hydrocarbon fluid is selected from the group consisting of crude oil, naphthas, gasoline, oil field condensates, residual fuels, petroleum distillates, light hydrocarbons, dry gas streams, paraffinic solvents, fuels comprising oxygenated compounds, biodiesel, and mixtures thereof.

3. The method of claim 1 where the effective scavenging amount of disubstituted azodicarboxylate in the hydrocarbon fluid ranges from about 8 to about 20 parts by weight based on 1 part as sulfur of sulfur-containing compounds.

4. The method of claim 1 where the effective scavenging amount of disubstituted azodicarboxylate in the hydrocarbon fluid ranges from about 8 to about 10 parts by weight based on 1 part as sulfur of sulfur-containing compounds.

5. The method of claim 1 where $R^1$ and $R^2$ are independently alkyl groups having from 2 to 3 carbon atoms.

6. The method of claim 1 where the sulfur-containing compounds are selected from the group consisting of $H_2S$, mercaptans and combinations thereof.

7. A method for scavenging sulfur-containing compounds from a hydrocarbon fluid, comprising adding to the hydrocarbon fluid from about 8 to about 20 parts by weight based on 1 part as sulfur of sulfur-containing compounds of at least one disubstituted azodicarboxylate of the formula $R^1OOCN=NCOOR^2$, where $R^1$ and $R^2$ are independently alkyl groups, alkenyl groups and aromatic groups having from 1 to 18 carbon atoms, where the hydrocarbon fluid is selected from the group consisting of crude oil, naphthas, gasoline, oil field condensates, residual fuels, petroleum distillates, light hydrocarbons, dry gas streams, paraffinic solvents, fuels comprising oxygenated compounds, biodiesel, and mixtures thereof, where it is not necessary that the mixture of the fluid and the scavenger be subjected to any particular temperature necessary to scavenge the mercaptans and/or $H_2S$.

8. The method of claim 7 where $R^1$ and $R^2$ are independently alkyl groups having from 2 to 3 carbon atoms.

9. The method of claim 7 where the sulfur-containing compounds are selected from the group consisting of $H_2S$, mercaptans and combinations thereof.

10. A hydrocarbon composition having a reduced concentration of sulfur-containing compounds, where the sulfur-containing compounds are selected from the group consisting of $H_2S$, mercaptans and combinations thereof, the hydrocarbon composition comprising:
    a hydrocarbon fluid;
    at least one sulfur-containing compound;
    an effective sulfur-containing compound scavenging amount of at least one disubstituted azodicarboxylate of the formula $R^1OOCN=NCOOR^2$, where $R^1$ and $R^2$ are independently alkyl groups, alkenyl groups and aromatic groups having from 1 to 18 carbon atoms; whereat least some of the additive has reacted with the sulfur-containing compound.

11. The hydrocarbon composition of claim 10 where the hydrocarbon fluid is selected from the group consisting of crude oil, naphthas, gasoline, oil field condensates, residual fuels, petroleum distillates, light hydrocarbons, dry gas streams, paraffinic solvents, fuels comprising oxygenated compounds, biodiesel, and mixtures thereof.

12. The hydrocarbon composition of claim 10 where the effective scavenging amount of disubstituted azodicarboxylate in the hydrocarbon fluid ranges from about 8 to about 20 parts by weight based on 1 part as sulfur of sulfur-containing compound.

13. The hydrocarbon composition of claim 10 where the effective scavenging amount of disubstituted azodicarboxylate in the hydrocarbon fluid ranges from about 8 to about 10 parts by weight based on 1 part as sulfur of sulfur-containing compound.

14. The hydrocarbon composition of claim 10 where $R^1$ and $R^2$ are independently alkyl groups having from 2 to 3 carbon atoms.

15. A hydrocarbon composition having a reduced concentration of sulfur-containing compounds, where the sulfur-containing compound is selected from the group consisting of $H_2S$, mercaptans and combinations thereof, the hydrocarbon composition comprising:
   a hydrocarbon fluid selected from the group consisting of crude oil, naphthas, gasoline, oil field condensates, residual fuels, petroleum distillates, light hydrocarbons, dry gas streams, paraffinic solvents, fuels comprising oxygenated compounds, biodiesel, and mixtures thereof;
   at least one sulfur-containing compound;
   from about 8 to about 20 parts by weight based on 1 part as sulfur of sulfur-containing compound of an effective sulfur-containing compound scavenging amount of at least one disubstituted azodicarboxylate of the formula $R^1OOCN=NCOOR^2$, where $R^1$ and $R^2$ are independently alkyl groups, alkenyl groups and aromatic groups having from 1 to 18 carbon atoms; where at least some of the additive has reacted with the sulfur-containing compound, where it is not necessary that the mixture of the fluid and the scavenger be subjected to any particular temperature necessary to scavenge the mercaptans and/or $H_2S$.

16. The hydrocarbon composition of claim 15 where $R^1$ and $R^2$ are independently alkyl groups having from 2 to 3 carbon atoms.

* * * * *